(12) United States Patent
Futami

(10) Patent No.: US 7,915,781 B2
(45) Date of Patent: Mar. 29, 2011

(54) WINDING METHOD FOR STATOR AND PERMANENT MAGNET MOTOR

(75) Inventor: Toshihiko Futami, Fuji (JP)

(73) Assignee: Toshiba Carrier Corporation, Tokyo (JP)

( * ) Notice: Subject to any disclaimer, the term of this patent is extended or adjusted under 35 U.S.C. 154(b) by 84 days.

(21) Appl. No.: 12/520,260

(22) PCT Filed: Dec. 19, 2007

(86) PCT No.: PCT/JP2007/074382
§ 371 (c)(1),
(2), (4) Date: Jun. 19, 2009

(87) PCT Pub. No.: WO2008/078616
PCT Pub. Date: Jul. 3, 2008

(65) Prior Publication Data
US 2010/0066197 A1    Mar. 18, 2010

(30) Foreign Application Priority Data

Dec. 27, 2006   (JP) ................................. 2006-352844

(51) Int. Cl.
*H02K 1/14* (2006.01)
*H02K 1/16* (2006.01)

(52) U.S. Cl. ............ 310/216.069; 310/216.004; 29/596; 29/606

(58) Field of Classification Search .................. 310/179, 310/180, 184–185, 216.004, 216.011–216.012, 310/216.06–216.07; 29/596–598, 606–607, 29/736, 744

See application file for complete search history.

(56) References Cited

U.S. PATENT DOCUMENTS

| 5,477,120 | A  | * | 12/1995 | Yoshimura et al. | ........... 318/696 |
| 6,703,748 | B2 | * | 3/2004  | Arai et al.      | ...................... 310/179 |
| 6,891,299 | B2 | * | 5/2005  | Coupart et al.   | .......... 310/156.55 |

(Continued)

FOREIGN PATENT DOCUMENTS

CN          1169277          9/2004

(Continued)

OTHER PUBLICATIONS

International Search Report of PCT/JP2007/074382, Feb. 13, 2008.

(Continued)

*Primary Examiner* — Tran N Nguyen
(74) *Attorney, Agent, or Firm* — DLA Piper LLP US

(57) ABSTRACT

In a stator winding method for winding conductive wires 8 around teeth 4a to 4f of a stator core 4 having 3n teeth 4a to 4f and 3n slots 5a to 5f by use of a bobbin machine 12 having three nozzles 13, the slots 5a to 5f on both sides of the teeth 4a, 4d, 4f in the $n^{th}$ winding process are formed, in respective slot portions on the side of the teeth 4a, 4d, 4f in the $n^{th}$ winding process, so that respective depths "A" are all smaller than respective depths "B" of the remaining portions. At the final stage of the $n^{th}$ winding process, the nozzles 13 are moved from the interior side of the slots 5a to 5f toward the inner circumferential side of the stator core 3 and furthermore, the conductive wires 8 are wound around the teeth 4b, 4d, 4f so that each gap 14 between the conductive wires 8 wound around the teeth 4b, 4d, 4f and the conductive wires 8 wound around the teeth 4a, 4c, 4e is smaller than an outer diameter of the nozzle 13.

3 Claims, 5 Drawing Sheets

U.S. PATENT DOCUMENTS

| | | | |
|---|---|---|---|
| 7,352,099 B2 * | 4/2008 | Schunk et al. | 310/216.069 |
| 2002/0093269 A1 * | 7/2002 | Harter et al. | 310/254 |
| 2005/0029890 A1 * | 2/2005 | Kadoya et al. | 310/180 |
| 2008/0224562 A1 * | 9/2008 | Qin et al. | 310/216 |

FOREIGN PATENT DOCUMENTS

| | | |
|---|---|---|
| JP | 11-89125 | 3/1999 |
| JP | 2000-232759 | 8/2000 |
| JP | 2001-197689 | 7/2001 |
| JP | 2002-325409 | 11/2002 |
| JP | 2004-274878 | 9/2004 |
| JP | 2007274809 A * | 10/2007 |

OTHER PUBLICATIONS

English abstract of JP-2002-325409, Nov. 8, 2002.

English abstract of JP-11-89125, Mar. 30, 1999.

English abstract of JP-2004-274878, Sep. 30, 2004.

English abstract of JP-2000-232759, Aug. 22, 2000.

English abstract of JP-2001-197689, Jul. 19, 2001.

Machine English language translation of JP-2002-325409, Nov. 8, 2002.

Machine English language translation of JP-11-89125, Mar. 30, 1999.

Machine English language translation of JP-2004-274878, Sep. 30, 2004.

Machine English language translation of JP-2000-232759, Aug. 22, 2000.

Machine English language translation of JP-2001-197689, Jul. 19, 2001.

English abstract of CN-1169277, Sep. 29, 2004.

* cited by examiner

WINDING METHOD FOR STATOR AND PERMANENT MAGNET MOTOR

TECHNICAL FIELD

The present invention relates to a winding method for a stator and a permanent magnet motor using the stator manufactured in accordance with the winding method.

BACKGROUND OF ART

In FIG. 1, a permanent magnet motor includes a stator 100 in the form of an annular ring and a rotor 102 rotatably accommodated in a hollow part 101 formed at the central area of the stator 100. In the stator 100, there are formed, at regular intervals, a plurality of teeth 103 projecting toward the inner circumferential side of the stator and a plurality of slots 104 each positioned between two adjacent teeth 103. Wound around each of the teeth 103 is a conductive wire 105 that is wired in the slots 104 on both sides of each tooth.

Winding of the conductive wires 105 around the teeth 103 is accomplished by using a bobbin machine having a plurality of nozzles arranged in a radial manner. For instance, when winding the conductive wires around six teeth 103 with the use of a bobbin machine with three nozzles, the winding is accomplished by two processes: a first winding process of winding a conductive wire around three teeth 103 arranged alternately; and a second winding process of winding a conductive wire around the other three teeth 103.

In this winding process, the bobbin machine is driven so that the nozzles go around the teeth 103 to be wound, and the conductive wires 105 getting out of the nozzles are wound around the teeth 103. For this reason, between the adjacent conductive wires 105 wound around the adjacent teeth 103, a gap 106 is defined in order to allow the nozzle to go around each of the teeth 103. This gap 106 is formed to be larger than the outer diameter of the nozzle.

In this way, since the gap 106 is formed between the conductive wires 105 wound around the adjacent teeth 103 and furthermore, the gap 106 is formed to be larger than the outer diameter of the nozzle, it is necessary to increase a cross-sectional area of the slot 104 (i.e. cross-sectional area in a plane perpendicular to the rotating axis of the rotor 102) by the gap 106 in addition to the cross-sectional area of the wound conductive wire 105.

If the cross-sectional area of each slot 104 increases, then the magnetic path about each of the teeth 103 and its continuous core portion of the stator 100 is narrowed that much to increase the density of flux with increased excitation loss, causing a problem of reducing the efficiency of the permanent magnet motor.

In order to solve such a problem, Japanese Patent Publication Laid-open No. 2004-274878 discloses one invention where a gap between the conductive wires wound around the adjacent teeth is reduced to decrease the cross-sectional area of each slot, so that the magnetic-path width can be increased to improve the efficiency of an electrical motor.

In this invention, using a bobbin machine equipped with the same number of nozzles as the number of slots, the winding operation is performed against all of the teeth simultaneously. Then, at a time of winding the conductive wire in the outermost circumference, the nozzles are moved from the interior side of the slots toward the inner circumferential side of the stator, making a gap between the adjacent conductive wires smaller than the outer diameter of the nozzle.

DISCLOSURE OF THE INVENTION

However, it is noted that the invention described in the above patent document was provided without any regard for the following respects.

Due to the use of the bobbin machine having the same number of nozzles as the number of slots, the number of wire bobbins on use and the number of routes for wiring the conductive wires are together increased to cause the mechanism of the bobbin machine to be complicated.

In addition, the machine's mechanism for swinging the nozzles in the radial direction is also complicated. Further, since the bobbin machine has a swinging mechanism whose swinging stroke depends on the diameter of each nozzle head and the numbers of nozzles, an increase in the number of nozzles would restrict the swinging stroke from being increased. If the swinging stroke is relatively small, then it becomes difficult for the bobbin machine to arrange and wire the conductive wires on the interior side of the slots, so that the winding condition of conductive wires is apt to be disheveled.

It is noted that the diameter of each nozzle head has only to be increased in order to ensure an increased swinging stroke. However, this measure would cause the inner diameter of the stator with to be increased with reduced magnetic-path widths in the stator, deteriorating the efficiency of the electrical motor.

Still further, since the conductive wires are wound around all the teeth simultaneously, the bobbin machine cannot perform continuous winding between poles. As a result, the number of terminals from the so-wounded conductive wires is increased to cause the wiring treatment for pick-finding wires etc. to be cumbersome and complicated.

In order to solve the problems like this, an object of the present invention is to provide a stator winding method capable of reducing the cross-sectional area of each slot and also increasing a stator's magnetic-path width thereby improving the efficiency of an electrical motor, and a permanent magnet motor using the stator.

According to a first aspect of the present invention, there is provided a stator winding method for winding conductive wires around an annular stator including a core having 3n (n: an integer number equal to or more than 2) teeth projecting toward an inner circumferential side of the stator and 3n slots each arranged between the adjacent teeth, wherein in a group of three teeth of the 3n teeth radially arranged at intervals of 120 degrees, respective slot portions of the slots positioned on both sides of each of the three teeth in the group and also positioned on the side of the each of the three teeth in the group are formed so that distances of the slot portions from a center of the stator are smaller than distances of the remaining slot portions from the center of the stator, the stator winding method comprising: preparing a bobbin machine having three nozzles arranged at intervals of 120 degrees radially; winding the conductive wires around the three teeth in the group in a $n^{th}$ winding process; and at the final stage of the $n^{th}$ winding process, moving the nozzles from an outer circumferential side of the slots toward the inner circumferential side, while winding the conductive wires around the teeth so that each gap between a part of conductive wires wound around each of the three teeth in the group in the $n^{th}$ winding process and another part of conductive wires wound around the teeth adjacent to the each of the three teeth in the group, is smaller than an outer diameter of the nozzle.

According to a second aspect of the present invention, there is provided a permanent magnet motor comprising: an annular stator including a core having 3n (n: an integer number equal to or more than 2) teeth projecting toward an inner circumferential side of the stator and 3n slots each arranged between the adjacent teeth, wherein in one group of three teeth of the 3n teeth radially arranged at intervals of 120 degrees, respective slot portions of the slots positioned on both sides of each of the three teeth in group and also positioned on the side of the each of the three teeth in group are formed so that distances of each of the slot portions from a center of the stator are smaller than distances of the remaining slot portions from the center of the stator; and a rotor having permanent magnets, the rotor being accommodated in a hollow part formed on the inner circumferential side of the core of the stator.

BEST MODE FOR CARRYING OUT THE INVENTION

There will be described embodiments of the present invention with reference to drawings.

1$^{st}$. Embodiment

Figure 1:
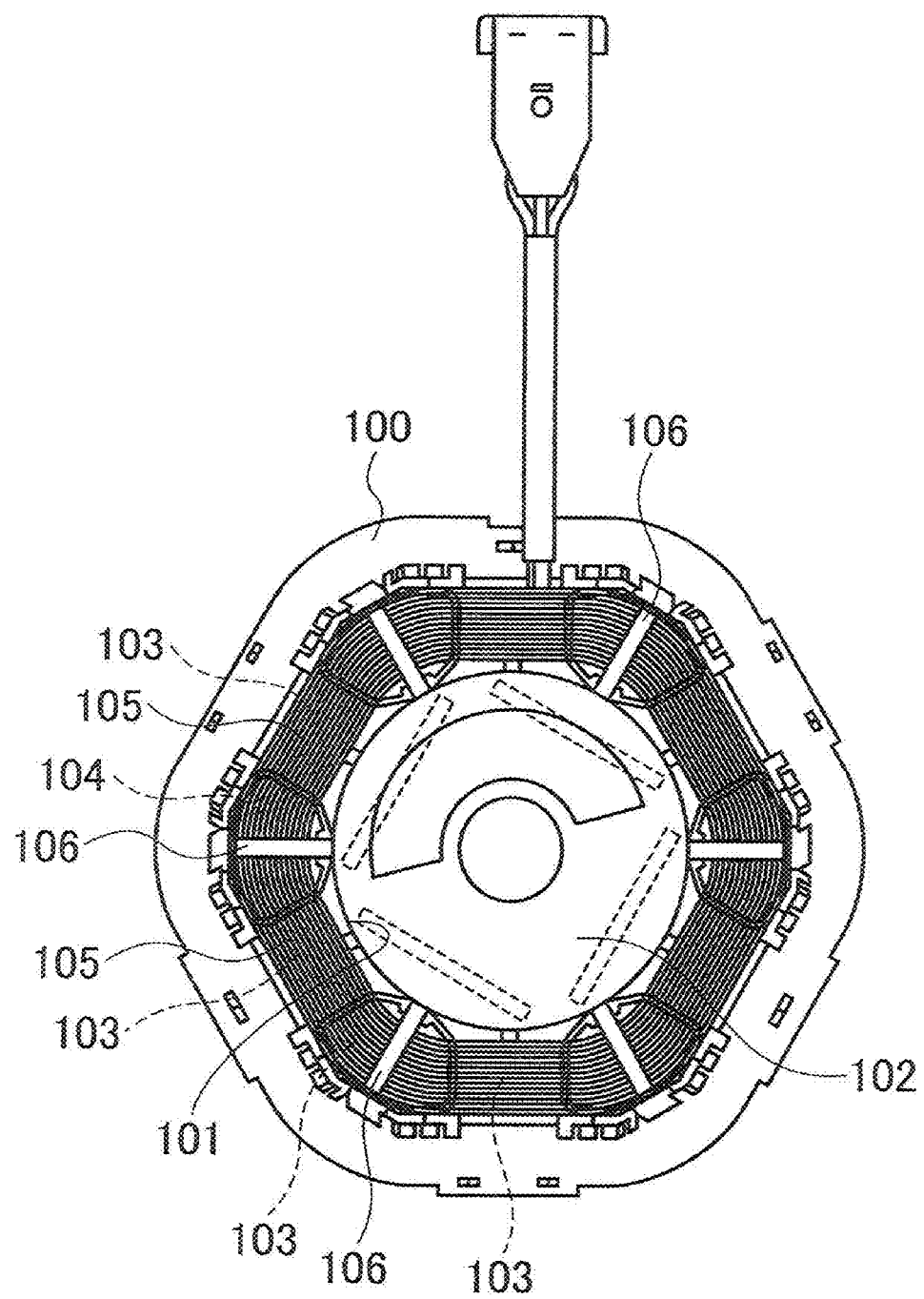
FIG. 1 is a plan view showing a permanent magnet motor in prior art.
Figure 2:
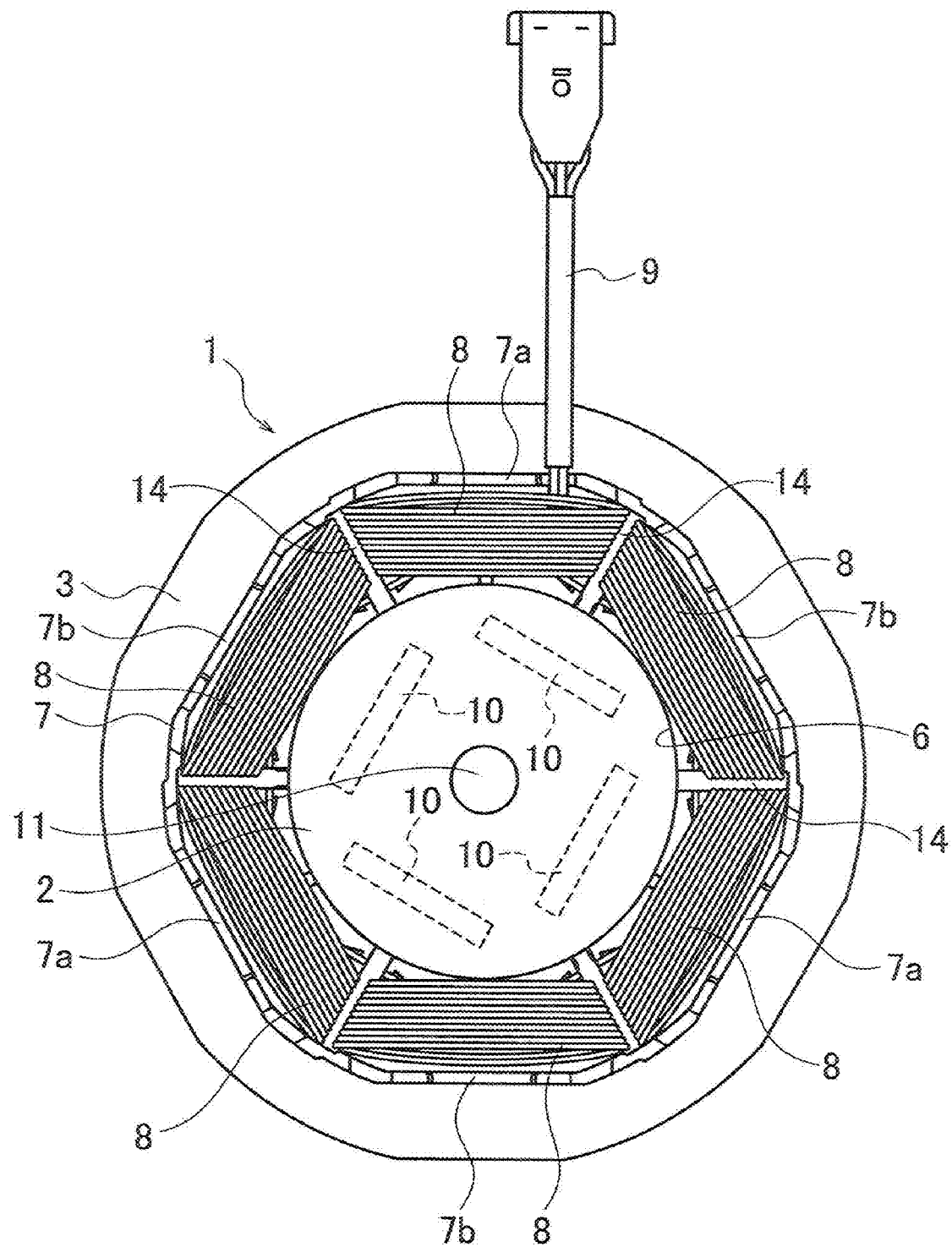
FIG. 2 is a plan view showing a permanent magnet motor in accordance with a first embodiment of the present invention.

The permanent magnet motor related to the first embodiment of the present invention comprises a stator 1 and a rotor 2, as shown in FIG. 2.

Figure 4:
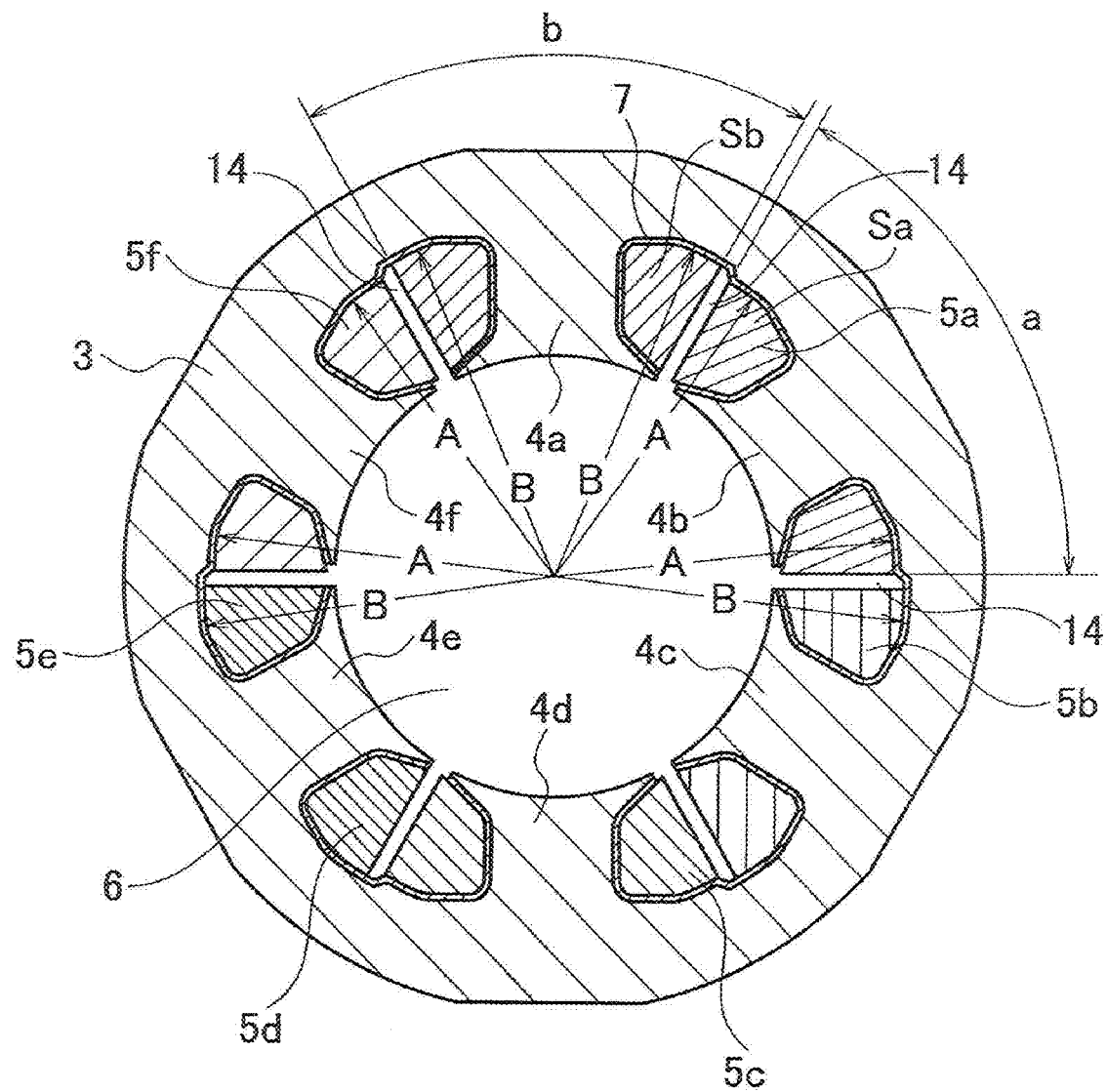
FIG. 4 is a horizontal cross-sectional view showing the profile of slots and the conductive wires wound around the teeth.

The stator 1 has an annular stator core 3 as shown in FIG. 4. This stator core 3 is formed with six teeth 4a, 4b, 4c, 4d, 4e and 4f projecting toward the inner circumferential side of the core and six slots 5a, 5b, 5c, 5d, 5e and 5f arranged between the adjacent teeth 4a, 4b, 4c, 4d, 4e and 4f, one-by-one. A hollow part 6 is formed in the inner circumferential part of the stator core 3. The stator core 3 is equipped with insulating frames 7 on which conductive wires 8 are wound with respect to the teeth 4a to 4f Respective ends of the conductive wires 8 are drawn out in the form of pick-finding wires 9, and these wires 9 are in turn connected to an energizing controller (not shown) for controlling power distribution to the conductive wires 8.

The rotor 2 is formed to provide a four-pole structure having four plate-type permanent magnets 10 and also accommodated in the hollow part 6 rotatably. The rotor 2 is provided, at its central part, with a rotating shaft 11.

Figure 3:
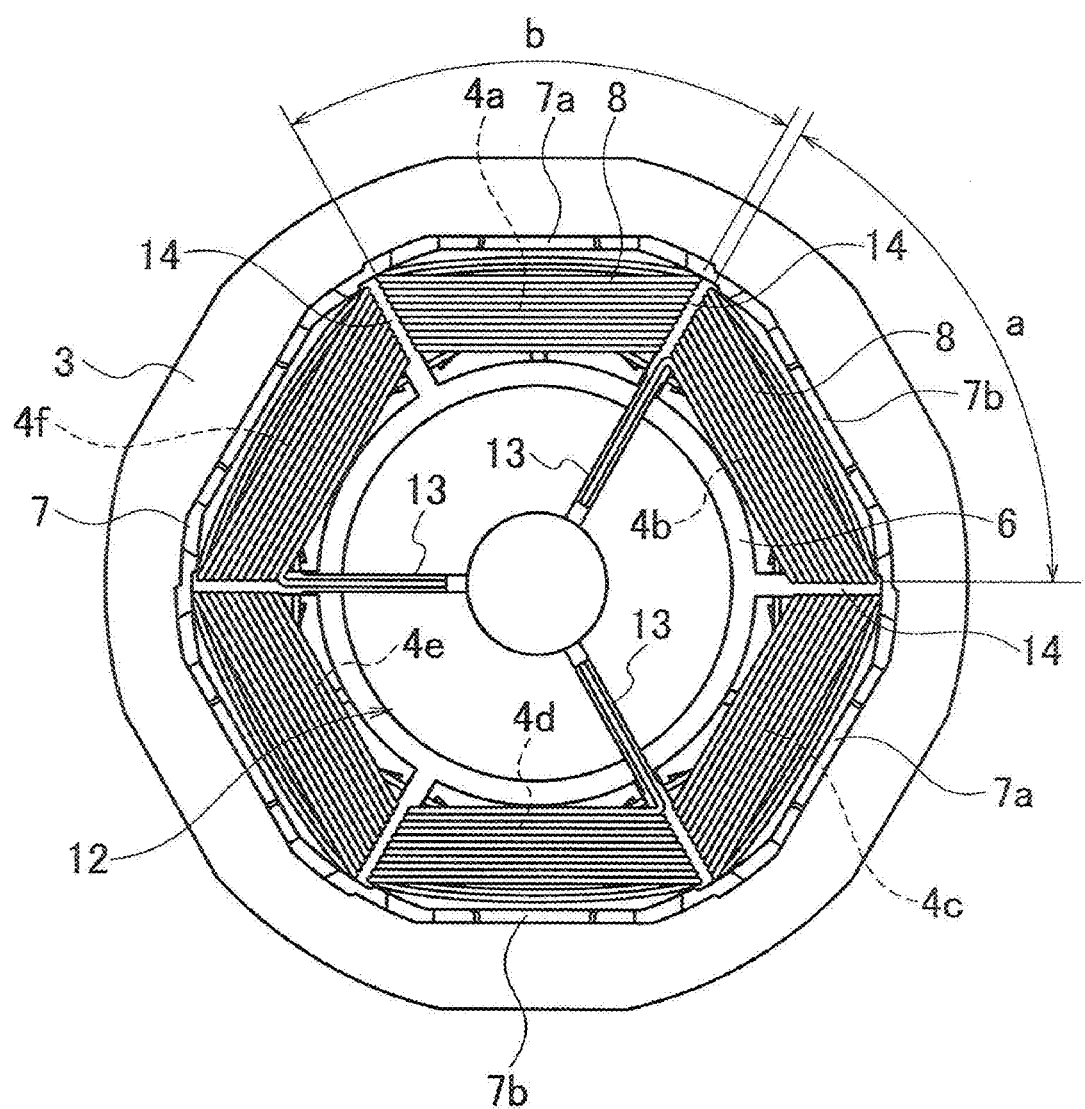
FIG. 3 is a plan view showing the winding operation of conductive wires onto teeth about a stator core.

The winding operation of the conductive wires 8 for the teeth 4a to 4f of the stator core 3 is performed by using a bobbin machine 12 positioned in the hollow part 6, as shown in FIG. 3. This bobbin machine 12 includes three nozzles 13 arranged in a radial manner at intervals of 120 degrees. The conductive wires 8 wound around a wire bobbin (not shown) are inserted into the nozzles 13 and successively, the conductive wires 8 drawn out of respective tips of the nozzles 13 are wound around the teeth 4a to 4f. In addition, the winding operation of the conductive wires 8 by the bobbin machine 12 is accomplished by two winding processes. In the first winding process, the conductive wires are wound around three teeth 4a, 4c and 4e arranged alternately. In the second winding process, the conductive wires are then wound around the other three teeth 4b, 4d and 4f. FIG. 3 illustrates a situation of the final stage of the second winding process.

In the teeth 4a to 4f, as shown in FIG. 4, their tips on the inner circumferential side are shaped to be identical to each other, and their width dimensions are equal to each other.

As for the profiles of the slots 5a to 5f on both sides of the teeth 4b, 4d and 4f in the second winding process, substantial-half portions of these slots on the side of the teeth 4b, 4d and 4f are formed so that their depths "A" from the center of the rotating shaft 11 are all smaller than respective depths "B" of the remaining substantial-half portions of the same slots from the center of the rotating shaft 11.

At the final stage of the second winding process to wind the wires around the teeth 4b, 4d and 4f, the nozzles 13 are moved from each interior side of the slots 5b, 5d and 5f toward the hollow part 6 on the inner circumferential side of the rotor core 3, while the conductive wires 8 in the second process are wound so that each gap 14 between the presently-wound wires 8 and the adjacent wires 8 wound around the other teeth 4a, 4c and 4e previously is smaller than the outer diameter of the nozzle 13. In addition, the conductive wires 8 in the second process are wound so that respective winding diameters are larger than those of the other conductive wires 8 wound around the other teeth 4a, 4c and 4e in the first process. That is, assume "a" represents a winding diameter of the conductive wires 8 wound in the second winding process, while "b" represents a winding diameter of the conductive wires 8 wound in the first winding process. Then, a relationship of "a>b" is established.

On the outer circumferential side of the insulating frames 7 fitted to the stator core 3, guards 7a and 7b are formed to guide the conductive wires 8 wound around the teeth 4a to 4f. The guards 7a serve to guide the conductive wires 8 wound around the teeth 4a, 4c and 4e, while the guards 7b serve to guide the conductive wires 8 wound around the teeth 4b, 4d and 4f.

In the constitution like this, the slots 5a to 5f on both sides of the teeth 4b, 4d and 4f having the conductive wires wound in the second winding process are formed so that respective depths "A" of substantial-half portions of the slots on the side of the teeth 4b, 4d and 4f are all smaller than respective depths "B" of the remaining substantial-half portions of the same slots, as shown in FIG. 4. Namely, in common with the slots 5a to 5f, a cross-sectional area Sa of each slot portion on the side of the teeth 4b, 4d and 4f gets smaller than a cross-sectional area Sb of each slot portion on the side of the teeth 4a, 4c and 4e. Consequently, in the stator core 4, respective core portions on the outer circumferential side of the teeth 4b, 4d and 4f have large magnetic-path widths (corresponding to the winding diameter a) in comparison with magnetic-path widths (corresponding to the winding diameter b) of respective core portions on the outer circumferential side of the teeth 4a, 4c and 4e. In this way, since the core's portion whose magnetic-path widths are increased are intentionally formed by reducing the cross-sectional areas of the slots 5a to 5f in the stator core 3 partially, it is possible to improve the efficiency of the permanent magnet motor without increasing the outer diameter of the stator core 3.

Despite the reduced cross-sectional areas of the slots (portions) 5a to 5f on the side of the teeth 4b, 4d and 4f, by moving the nozzles 13 from the interior side of the slots 4a to 4f toward the hollow part 6 on the inner circumferential side of the stator core 3 and furthermore winding the conductive wires 8 so that each of gaps between the conductive wires 8 wounded around the teeth 4b, 4d and 4f in the second winding process and those wounded around the other teeth 4a, 4c and 4e is smaller than the outer diameter of the nozzle 13, each winding diameter "a" of the conductive wires 8 wound around the teeth 4b, 4d and 4f is made larger than each winding diameter "b" of the conductive wires 8 wound around the teeth 4a, 4c and 4e. Consequently, it is possible to equalize the number of windings of the conductive wires 8 to be wounded around the teeth 4a to 4f, preventing magnetic unevenness among the teeth 4a to 4f due to the difference in the number of windings of the conductive wires 8 around the teeth 4a to 4f.

In addition, as the teeth 4a to 4f are identical to each other in terms of its tip profile and width, it is possible to prevent magnetic unevenness throughout the teeth 4a to 4f that would be caused since the teeth 4a to 4f are different from each other in terms of the tip profile and the width.

Although the above embodiment is illustrated by an example of the stator having six teeth 4a to 4f and six slots 5a to 5f, the present invention is also applicable to a stator where the number of teeth (and also slots) is multiples of 3 besides 6. For instance, suppose the numbers of teeth and slots are together equal to 9. Then, the winding operation may be divided into three winding processes each for three teeth. In connection, regarding the slots on both sides of the teeth to be processed in the third (final) winding process, their profiles have only to be shaped so that the depths of substantial-half portions of the slots on the side of the same teeth become "A" while the depths of the remaining substantial-half portions of the same slots become "B". In addition, regarding to the conductive wires 8 to be wound in the third winding process, the winding diameter "a" has only to be larger than the winding diameter "b" of the conductive wires 8 wounded in the first and second winding processes.

$2^{nd}$. Embodiment

Figure 5:
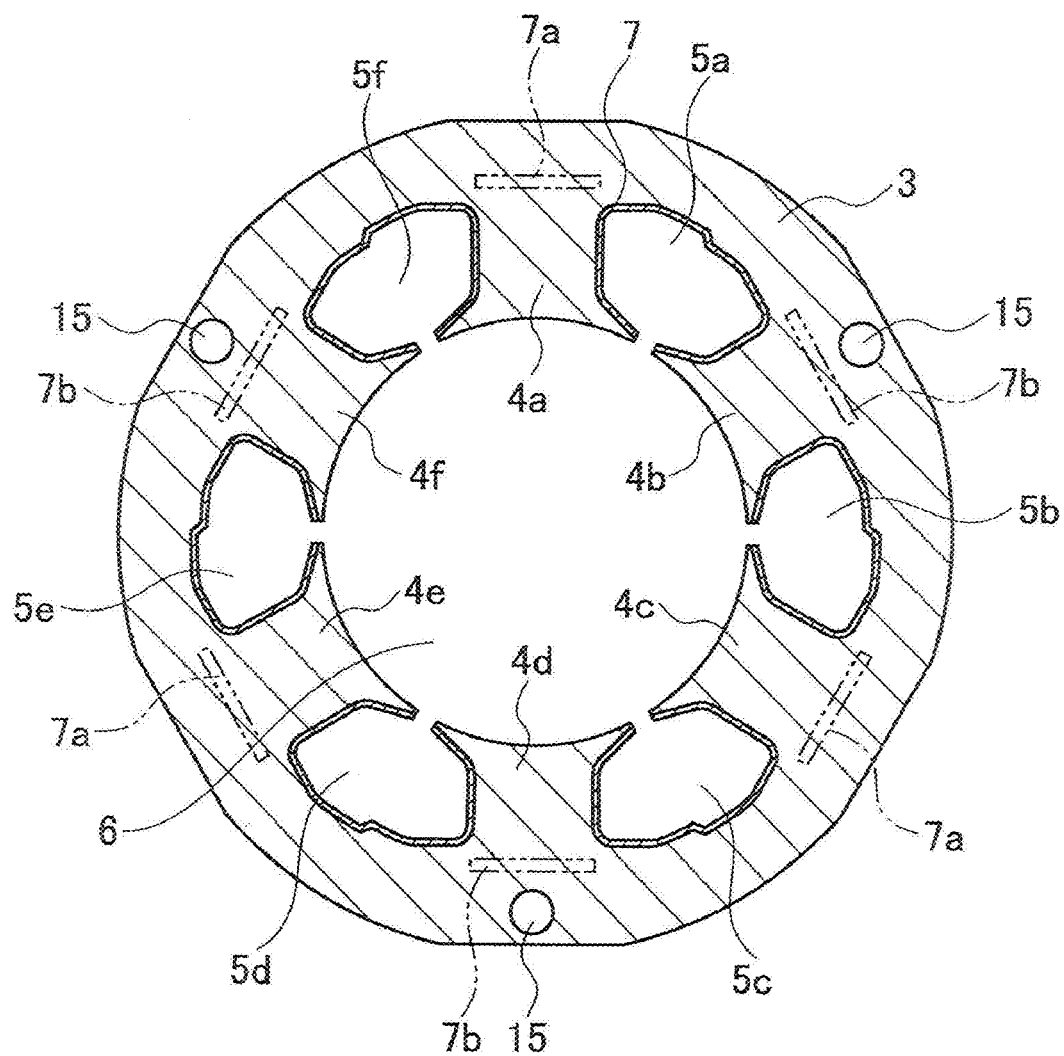
FIG. 5 is a plan view showing a stator core of the permanent magnet motor in accordance with a second embodiment of the present invention.

The permanent magnet motor related to the second embodiment of the present invention will be described with reference to FIG. 5. Note that constituents identical to those of the first embodiment are indicated with the same reference numerals respectively and their overlapping descriptions are eliminated.

The essential structure of the permanent magnet motor of the second embodiment is the same as that of the permanent magnet motor of the first embodiment. In the permanent magnet motor of the second embodiment, contrary to the permanent magnet motor of the first embodiment, the stator core 3 is formed, at regular intervals, with three bolt holes 15 as fixation holes for receiving bolts (not shown) as fixing members when fixing the stator 1 to a frame (not shown).

The bolt holes 15 are formed in a part of the stator core 3 on the outer circumferential side of the teeth 4b, 4d and 4f for the second winding process.

Further, on the outer circumferential side of the insulating frames 7 attached to the stator core 3, guard 7a and 7b are formed to guide the conductive wires 8 wound around the teeth 4a to 4f.

On both sides of the teeth 4b, 4d and 4f close to the bolt holes 15, the slots 5a to 5f are characterized by respective depths "A (A<B)", allowing the guards 7b to be positioned on the inner circumferential side of the guards 7a in the stator core 3. Thus, owing to the formation of the bolt holes 15 on the outer circumferential side of the teeth 4b, 4d and 4f, it is possible to prevent the bolts attached in the bolt holes 15 from interfering with the guards 7b, allowing the fastening operation of bolts to be performed with ease.

INDUSTRIAL APPLICABILITY

According to the present invention, it is possible to reduce the cross-sectional area of the slots and increase the magnetic-path width of the stator, allowing the electrical motor to be improved in its efficiency.

The invention claimed is:

1. A stator winding method for winding conductive wires around an annular stator including a core having 3n (n: an integer number equal to or more than 2) teeth projecting toward an inner circumferential side of the stator and 3n slots each arranged between the adjacent teeth, wherein in a group of three teeth of the 3n teeth radially arranged at intervals of 120 degrees, respective slot portions of the slots positioned on both sides of each of the three teeth in the group and also positioned on the side of the each of the three teeth in the group are formed so that distances of the slot portions from a center of the stator are smaller than distances of the remaining slot portions from the center of the stator, the stator winding method comprising:
    preparing a bobbin machine having three nozzles arranged at intervals of 120 degrees radially;
    winding the conductive wires around the three teeth in the group in a $n^{th}$ winding process; and
    at the final stage of the $n^{th}$ winding process, moving the nozzles from an outer circumferential side of the slots toward the inner circumferential side, while winding the conductive wires around the teeth so that each gap between a part of conductive wires wound around each of the three teeth in the group in the $n^{th}$ winding process and another part of conductive wires wound around the teeth adjacent to the each of the three teeth in the group, is smaller than an outer diameter of the nozzle.

2. A permanent magnet motor comprising:
    an annular stator including a core having 3n (n: an integer number equal to or more than 2) teeth projecting toward an inner circumferential side of the stator and 3n slots each arranged between the adjacent teeth, wherein in one group of three teeth of the 3n teeth radially arranged at intervals of 120 degrees, respective slot portions of the slots positioned on both sides of each of the three teeth in group and also positioned on the side of the each of the three teeth in group are formed so that distances of each of the slot portions from a center of the stator are smaller than distances of the remaining slot portions from the center of the stator; and
    a rotor having permanent magnets, the rotor being accommodated in a hollow part formed on the inner circumferential side of the core of the stator.

3. The permanent magnet motor of claim 2, wherein the core of the stator is formed, in its part on the outer circumferential side of the three teeth in the group, with a fixation hole into which a fixing member for fixing the stator to a frame is attached.

* * * * *